United States Patent
Liu et al.

(10) Patent No.: US 8,871,176 B2
(45) Date of Patent: Oct. 28, 2014

(54) PROCESS FOR REDUCING SULFUR EMISSION OF SULFUR PLANT

(71) Applicant: China Petroleum & Chemical Corporation, Beijing (CN)

(72) Inventors: Aihua Liu, Shandong (CN); Yongchang Xu, Shandong (CN); Qinshu Li, Shandong (CN); Jianbang Ren, Shandong (CN); Jianli Liu, Shandong (CN); Yiling Zhang, Shandong (CN)

(73) Assignee: China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 14/031,215

(22) Filed: Sep. 19, 2013

(65) Prior Publication Data

US 2014/0079614 A1 Mar. 20, 2014

(30) Foreign Application Priority Data

Sep. 19, 2012 (CN) .......................... 2012 1 0349499

(51) Int. Cl.
  *C01B 17/02* (2006.01)
  *C01B 17/04* (2006.01)
  *C01B 17/05* (2006.01)
(52) U.S. Cl.
  CPC .............. *C01B 17/05* (2013.01); *C01B 17/021* (2013.01); *C01B 17/04* (2013.01)
  USPC .................. 423/573.1; 423/574.1; 423/576.2; 423/578.1
(58) Field of Classification Search
  USPC ........................ 423/573.1, 574.1, 576.2, 578.1
  See application file for complete search history.

(56) References Cited

U.S. PATENT DOCUMENTS

| | | | |
|---|---|---|---|
| 3,617,221 A * | 11/1971 | Egan et al. ................ | 423/574.1 |
| 3,681,024 A * | 8/1972 | Hujsak et al. ................ | 423/575 |
| 4,478,811 A * | 10/1984 | Hass .......................... | 423/574.1 |
| 6,569,398 B2 * | 5/2003 | Fenderson ................ | 423/573.1 |

(Continued)

FOREIGN PATENT DOCUMENTS

| | | |
|---|---|---|
| CN | 86101352 A | 10/1986 |
| CN | 1290651 A | 4/2001 |
| CN | 1382105 A | 11/2002 |
| CN | 1882499 A | 12/2006 |
| CN | 101389568 A | 3/2009 |

(Continued)

OTHER PUBLICATIONS

Jingqian Fu, et al, Comparative Analysis of Operation Situtation on the Five Extended Claus Sulfur Recovery Units, Chemical Engineering of Oil & Gas, vol. 41, No. 2, pp. 148-155 and 168, 2012, English Abstract on p. 246.

*Primary Examiner* — Timothy Vanoy
(74) *Attorney, Agent, or Firm* — Novick, Kim & Lee, PPLC; Allen Xue (57) ABSTRACT

The present invention provides a process for reducing sulfur emission of a sulfur plant, wherein the sulfur plant includes a thermal reaction unit, a catalytic reaction unit and a tail-gas purification unit, the process is characterized in that the waste-gas from the degassing of the liquid sulfur in the liquid sulfur tank is introduced into the catalytic reaction unit, and/or the waste-gas from the degassing of the liquid sulfur in the liquid sulfur tank is introduced into the tail-gas purification unit. In present invention, the H2S in purified tail-gas can be reduced to no more than 10 ppm(v) and the $SO_2$ emission concentration of the sulfur plant can be reduced to no more than 100 mg/m$^3$.

14 Claims, 5 Drawing Sheets

(56) References Cited

U.S. PATENT DOCUMENTS

| | | |
|---|---|---|
| 7,250,149 B1 * | 7/2007 | Smith .................... 423/573.1 |
| 7,311,891 B2 | 12/2007 | Dolan et al. |
| 7,927,577 B2 * | 4/2011 | Rameshni et al. ......... 423/567.1 |
| 8,679,448 B2 * | 3/2014 | Chow et al. ................ 423/576.2 |
| 2011/0171115 A1 * | 7/2011 | Stevens et al. ............. 423/574.1 |

FOREIGN PATENT DOCUMENTS

| | | |
|---|---|---|
| CN | 101565172 A | 10/2009 |
| CN | 101693164 A | 4/2010 |
| CN | 101791517 A | 8/2010 |
| CN | 101850950 A | 10/2010 |

* cited by examiner

Prior Art

Fig. 5

Prior Art

PROCESS FOR REDUCING SULFUR EMISSION OF SULFUR PLANT

The present application claims the priority of China Patent Application No. 201210349499.8 filed on Sep. 19, 2012, which is incorporated herein by reference in its entirety.

TECHNICAL FIELD

The present invention relates to the filed of sulfur recovery, in particular to a process for reducing the sulfur (for example $SO_2$) emission of a sulfur plant.

BACKGROUNDS

With the development of society, environmental pollution has become a restrict factor of economic development and is an important section in government legislation. Sulfur emission is severely restricted in developed countries. For example, according to the regulations of Environmental Protection Agency of The Federal Government of the United States, the $SO_2$ emission in furnace flue gas, sulfur tail-gas and catalytic cracking regeneration flue gas in petroleum refining industry is limited to 50 ppm(v), equaling to about 143 mg/m³.

New techniques for tail-gas treatment of Claus sulfur recovery are under development. U.S. Pat. No. 7,311,891 B2 discloses a process for recovering sulfur from Claus tail-gas by adsorption, wherein the tail-gas comprising $SO_2$ is passed through an adsorption bed wherein $SO_2$ is adsorbed by an adsorbent. The $SO_2$ is then deadsorbed by purging with an inert gas and the deadsorbed gas comprising $SO_2$ is recycled to Claus apparatus for further conversion.

Main factors which influence the $SO_2$ emission concentration of sulfur plant include purified tail-gas and waste-gas from degassing of liquid sulfur.

The total sulfur content in the purified tail-gas is closely related to the purification ability of desulphurizer and the conversion rate of the Claus tail-gas hydrogenation catalyst (particularly the content of organo-sulfur compound(s)). The purified tail-gas comprises mainly unadsorbed $H_2S$ and organo-sulfur compound(s), which are converted into $SO_2$ through incineration in incinerator, leading to a $SO_2$ emission of 150-500 mg/m³. The total sulfur content in the purified tail-gas can be decreased substantially by using a high efficiency desulphurizer. For example, compounded high efficiency desulphurizer HS103 from The Dow Chemical Company can decrease $H_2S$ in the purified tail-gas to not more than 10 ppm (10-20 mg/m³ $SO_2$ emission).

Degassing of liquid sulfur is an important measure in the safety operation of sulfur recovery plant. Generally $H_2S$ is present in the sulfur produced by Claus process in an amount of 300-500 ppm(v). Without the degassing of the liquid sulfur, the polysulfide ($H_2S_X$) dissolved in the liquid sulfur will decompose to produce H2S during the storage, transportation and processing of liquid sulfur and the produced $H_2S$ will be released together with the $H_2S$ dissolved in the liquid sulfur. When $H_2S$ accumulates to a certain concentration, it will cause toxic action or even has a possibility of explosion. In another aspect, solid sulfur formed from undegassed sulfur is fragile, producing more fine particles and powder of sulfur during loading and unloading and transportation.

The basic principle of degassing of liquid sulfur is to release the dissolved H2S and to decompose polysulfide rapidly according to $H_2S_X \rightarrow H_2S + S_{X-1}$, and finally remove $H_2S$ from liquid sulfur. The total H2S in the degassed liquid sulfur is not more than 0.001 wt %. Generally, the stripping gas for liquid sulfur degassing is air, steam, Claus tail-gas or nitrogen. Steam can lead to corrosion of pipes and equipments easily. $H_2S$ contained in Claus tail-gas will equilibrate with free $H_2S$ in the liquid sulfur and thus $H_2S$ in the liquid sulfur could not be reduced to less than 10 ppm. Nitrogen has low oxygen content and thus is not favorable for the oxidation of sulfur-containing compounds. Therefore air is preferably used as the stripping gas for degassing of liquid sulfur. However, the amount of gas to be processed will be increased due to the use of an external gas-source, leading to enlargement of pipes and equipments.

Currently, the waste-gas from degassing of liquid sulfur is treated by incinerating in an incinerator, wherein the waste-gas comprising $H_2S$, sulfur vapor and the like is introduced into the incinerator directly and the sulfur-containing substance is burned into $SO_2$, leading to a $SO_2$ emission of 150-200 mg/m³.

There is always a requirement for processes for reducing sulfur emission of flue gas of a sulfur plant.

SUMMARY OF PRESENT INVENTION

One of the technical problems to be solved in present invention is to reduce the $SO_2$ emission concentration of a sulfur plant, wherein the $SO_2$ emission content can be decreased to not more than about 100 mg/m³, preferably not more than about 80 mg/m³. A process for solving this technical problem is provided in present invention, which process needs a small investment, has a low operating cost and is environment-friendly and energy-saving.

According to one aspect of present invention, a process for reducing sulfur or $SO_2$ emission of a sulfur plant is provided, wherein the sulfur plant includes a thermal reaction unit, a catalytic reaction unit and a tail-gas purification unit, the process includes:

introducing a $H_2S$-containing acid gas into the thermal reaction unit, combusting the $H_2S$-containing acid gas to produce $SO_2$, and conducting Claus reaction between $H_2S$ and $SO_2$ so as to produce element sulfur and a process gas, wherein the element sulfur is introduce into a liquid sulfur tank to obtain liquid sulfur;

introducing the process gas into the catalytic reaction unit to carry out Claus catalytic conversion so as to obtain element sulfur and Claus tail-gas, wherein the obtained element sulfur is introduced into the liquid sulfur tank; and introducing the Claus tail-gas into the tail-gas purification unit, wherein the Claus tail-gas firstly undergoes hydrogenation to produce a hydrogenation tail-gas, and then the hydrogenation tail-gas which comprises $H_2S$ is cooled down and introduced into an absorption column, wherein $H_2S$ is absorbed in the absorption column to provide a purified tail-gas;

characterized in that the waste-gas from the degassing of the liquid sulfur in the liquid sulfur tank is introduced into the catalytic reaction unit, and/or the waste-gas from the degassing of the liquid sulfur in the liquid sulfur tank is introduced into the tail-gas purification unit.

An aspect of present invention relates to the introduction of waste-gas from the degassing of the liquid sulfur into the catalytic reaction unit, and/or the tail-gas purification unit. The introduction of the waste-gas into the incinerator and the discharging after burning thus are avoided and sulfur emission is reduced. Another aspect of present invention relates to a feature or improvement wherein a portion of the purified tail-gas is used as stripping gas for the liquid sulfur tank, and thus the use of air, nitrogen or steam is omitted. According to another aspect of present invention, in the process of present invention, a portion of the purified tail-gas is used as stripping gas for the liquid sulfur tank, and the resulting waste-gas from the degassing of the liquid sulfur is mixed with the Claus tail-gas and then introduced into hydrogenation reactor of the tail-gas purification unit. These features or improvements according to present invention decrease the $SO_2$ emission concentration of sulfur recovery plant efficiently.

The present invention further relates to use of purified tail-gas from a sulfur plant as stripping gas of degassing of liquid sulfur.

The present invention includes, but not limited to, the following specific embodiments:

Item 1. A process for reducing sulfur emission of a sulfur plant, wherein the sulfur plant includes a thermal reaction unit, a catalytic reaction unit and a tail-gas purification unit, the process includes:

introducing a $H_2S$-containing acid gas into the thermal reaction unit, combusting the $H_2S$-containing acid gas to produce $SO_2$, and conducting Claus reaction between $H_2S$ and $SO_2$ so as to produce element sulfur and a process gas, wherein the element sulfur is introduced into a liquid sulfur tank to obtain liquid sulfur;

introducing the process gas into the catalytic reaction unit to carry out Claus catalytic conversion so as to obtain element sulfur and Claus tail-gas, wherein the obtained element sulfur is introduced into the liquid sulfur tank; and introducing the Claus tail-gas into the tail-gas purification unit, wherein the Claus tail-gas firstly undergoes hydrogenation to produce a hydrogenation tail-gas, and then the hydrogenation tail-gas which comprises $H_2S$ is cooled down and introduced into an absorption column, wherein $H_2S$ is absorbed in the absorption column to provide a purified tail-gas;

characterized in that the waste-gas from the degassing of the liquid sulfur in the liquid sulfur tank is introduced into the catalytic reaction unit, and/or the waste-gas from the degassing of the liquid sulfur in the liquid sulfur tank is introduced into the tail-gas purification unit.

Item 2. The process according to item 1, characterized in that a portion of the purified tail-gas is introduced into the liquid sulfur tank as stripping gas for the degassing of the liquid sulfur.

Item 3. The process according to item 1, characterized in that a portion of the purified tail-gas is introduced into the liquid sulfur tank as stripping gas for the degassing of the liquid sulfur, and the waste-gas from the degassing of the liquid sulfur is introduced into the tail-gas purification unit together with the Claus tail-gas.

Item 4. The process according to item 2 or 3, characterized in that the amount of the purified tail-gas that is introduced into the liquid sulfur tank is from about 300 to about 1000 $Nm^3/h$.

Item 5. The process according to item 1, characterized in that the content of $H_2S$ in the purified tail-gas is less than about 50 ppm by volume.

Item 6. The process according to item 5, characterized in that the content of $H_2S$ in the purified tail-gas is less than about 10 ppm by volume.

Item 7. The process according to item 1 or 5, characterized in that the absorption column has a desulphurizer such that the content of H2S in the purified tail-gas is less than about 50 ppm by volume at an absorption temperature of from about 25 to about 42° C.

Item 8. The process according to item 7, characterized in that the desulphurizer is the high efficiency desulphurizer HS 103 from The Dow Chemical Company.

Item 9. The process according to item 1, characterized in that the hydrogenation is conducted in the presence of an oxygen-resistant hydrogenation catalyst, preferably a low-temperature oxygen-resistant hydrogenation catalyst.

Item 10. The process according to item 9, characterized in that the hydrogenation catalyst enables the tail-gas purification unit to receive such a gas which comprises, by volume, $H_2S$ from about 0.1 to about 5%, $SO_2$ from about 0 to about 1.5%, and organo-sulfur compound(s) from about 0 to about 0.5%; and enables a hydrogenation and hydrolysis conversion of at least about 99.9%.

Item 11. The process according to item 9 or 10, characterized in that the hydrogenation catalyst is LSH-03 from Shandong Qilu Keli Chemical Institute Co., Ltd.

Item 12. The process according to item 1, characterized in that the absorption column is connected to a regenerating column and the regenerated acid gas is sent to the thermal reaction unit.

Item 13. Use of purified tail-gas from a sulfur plant as stripping gas of degassing of liquid sulfur.

BRIEF DESCRIPTION OF DRAWINGS

FIG. 4.

IN FIGS

1—acid gas; 2—reaction furnace; 3—first converter; 4—second converter; 5—Claus tail-gas; 6—hydrogenation reactor; 7—quenching column; 8—absorption column; 9—purified tail-gas; 10—waste-gas of liquid sulfur degassing; 11—liquid sulfur tank; 12—incinerator; 13—regeneration column; 14—regenerated acid gas; 15—lean amine solution 16—air or nitrogen; 17—preheater; 18—steam; 19—steam ejector; 20—tail-gas from reaction furnace (process gas); 21—tail-gas from first converter.

EMBODIMENTS FOR CARRYING OUT PRESENT INVENTION

The present invention is an improvement to Claus sulfur recovery process and accordingly the process or apparatus according to present invention is identical or similar to those conventional Claus process or apparatus, except modification(s) or improvement(s) made according to present invention.

In the process according to present invention, said sulfur plant, similar to or identical to Claus sulfur recovery plant known in prior art, also includes a thermal reaction unit (corresponding to thermal reaction section), a catalytic reaction unit (corresponding to catalytic reaction section) and a tail-gas purification unit (corresponding to tail-gas purification section).

In the process according to present invention, $H_2S$-containing acid gas is introduced into the thermal reaction unit or thermal reaction section. The acid gas generally is from the upstream desulphurization unit in oil refinery, natural gas purification plant or coal chemical industry. The concentration of $H_2S$ in the acid gas varies depending on the sources. The acid gas from oil refinery has a high $H_2S$ concentration, and the $H_2S$ concentration generally is at least 70% by volume. The concentration of $H_2S$ in other acid gases is lower, but generally is not less than 20% by volume.

In the thermal reaction unit, the $H_2S$ containing acid gas is combusted in the presence of air, for example in a reaction furnace. According to an embodiment, the temperature for combustion is from about 900 to about 1400° C. During the combustion, $H_2S$ is converted into $SO_2$; and according to an embodiment, about one third of the $H_2S$ is converted into $SO_2$. The produced $SO_2$ then undergoes Claus reaction with $H_2S$, for example in a Claus reactor. Finally, element sulfur and a process gas are obtained, wherein the process gas comprises $H_2S$, $SO_2$, COS, $CS_2$ and so on. Generally, the reactions associated in the thermal reaction unit include mainly:

$$2H_2S+3O_2 \rightarrow 2SO_2+2H_2O$$

$$SO_2+2H_2S \rightarrow 2H_2O+3S$$

After the thermal reaction section conducted in the thermal reaction unit, element sulfur and the process gas are obtained, wherein the element sulfur is introduced into a liquid sulfur tank to provide liquid sulfur.

The thermal reaction unit and the thermal reaction procedure conducted in the thermal reaction unit (including the reaction furnace, Claus reactor, liquid sulfur tank and so on) are well known in the art. In the process according to present invention, those thermal reaction units and thermal reaction procedures known in the art can be used, provided the advantageous technical effects of present invention are not impaired.

In the process according to present invention, the process gas obtained from the thermal reaction unit or thermal reaction procedure is sent to the catalytic reaction unit or catalytic reaction section. The catalytic reaction unit includes at least one converter, preferably the catalytic reaction unit includes a first converter and a second converter in sequential. According to an embodiment, a Claus catalyst is packed in the converter(s). The Claus catalyst is well known in the art, and any appropriate Claus catalyst can be used, for example alumina catalyst, titania catalyst and so on. According to an embodiment of present invention, the first converter can be operated under the following conditions: temperature about 260-about 350° C., and space velocity about 400-about 1600 $h^{-1}$. According to another embodiment of present invention, the second converter can be operated under the following conditions: temperature about 200-about 260° C., and space velocity about 400-about 1600 $h^{-1}$. In the catalytic reaction unit, the process gas undergoes Claus catalytic conversion so as to provide element sulfur and Claus tail-gas. The element sulfur is condensed and introduced into the liquid sulfur tank. The resulting Claus tail-gas comprises $H_2S$, $SO_2$, and sulfur compounds such as COS, $CS_2$ and the like. Generally, the reactions associated in the catalytic reaction unit include mainly:

$$SO_2+2H_2S \rightarrow 2H_2O+3S$$

$$COS+H_2O \rightarrow H_2S+CO_2$$

$$CS_2+H_2O \rightarrow 2H_2S+CO_2$$

The catalytic reaction unit and the corresponding catalytic reaction procedure are well known in the art. In the process according to present invention, those catalytic reaction units and corresponding catalytic reaction procedures known in the art can be used directly, provided the advantageous technical effects of present invention are not impaired.

In the process according to present invention, the Claus tail-gas obtained from the catalytic reaction unit or catalytic reaction procedure is sent to the tail-gas purification unit. The tail-gas purification unit can include a hydrogenation reactor and an absorption column.

In the process according to present invention, the Claus tail-gas sent to the tail-gas purification unit is firstly introduced into the hydrogenation reactor to conduct hydrogenation.

According to an embodiment, the Claus tail-gas is heated to about 200-about 300° C. and then introduced into the hydrogenation reactor. This hydrogenation reactor comprises a hydrogenation catalyst. According to an embodiment, the hydrogenation catalyst comprises Co and/or Mo as active ingredient and alumina or alumina/titania as support. Under the action of the hydrogenation catalyst, the element sulfur, $SO_2$ and so on contained in the Claus tail gas are hydrogenated into $H_2S$, and COS, $CS_2$ and so on are hydrolyzed into $H_2S$. For example, the reactions can be illustrated as follows:

$$SO_2+3H_2=H_2S+2H_2O$$

$$S_8+8H_2=8H_2S$$

$$COS+H_2O \rightarrow H_2S+CO_2$$

$$CS_2+2H_2O \rightarrow 2H_2S+CO_2$$

The hydrogenation tail-gas is obtained from the hydrogenation. The hydrogenation reactor, hydrogenation catalyst and the related reactions are known in the art. In the process according to present invention, the hydrogenation reactors and hydrogenation catalysts known in the art can be used, provided the advantageous technical effects of present invention are not impaired.

The hydrogenation tail-gas is then cooled down and sent into the absorption column. According to an embodiment, the hydrogenation tail-gas is cooled to about 25-about 42° C. According to a preferred embodiment, the $H_2S$-containing hydrogenation tail-gas is cooed by fast cooling (quenching), for example through a quenching column. For example, the hydrogenation tail-gas is contacted with a quenching water so as to be cooled down. According to an embodiment, the $H_2S$-containing hydrogenation tail-gas is cooled to about 25-about 42° C. through a quenching column.

The cooled hydrogenation tail-gas then is introduced into the absorption column. In the absorption column, $H_2S$ is absorbed so as to provide the purified tail-gas having a reduced content of $H_2S$. According to an embodiment of present invention, the absorption column is an amine solution absorption column wherein $H_2S$ is absorbed by the amine solution. For example, the amine can be N-methyl diethanol amine (MDEA). According to a preferred embodiment, the absorption column is an amine solution absorption column with a high efficiency desulphurizer. For example, the high efficiency desulphurizer can be HS 103 from The Dow Chemical Company. According to an embodiment of present invention, the desulphurizer enables a $H_2S$ content (by volume) in the purified tail-gas of less than about 50 ppm, preferably less than about 10 ppm.

The absorption column can be connected to a regeneration column and the regenerated acid gas can be recycled to the thermal reaction unit for further recovery of element sulfur.

In the process according to present invention, the waste gas of degassing of liquid sulfur can be introduced into the catalytic reaction unit and/or the tail-gas purification unit. For example, the waste gas resulting from the degassing of liquid sulfur is ejected out, for example through an ejector, and then introduced into the catalytic reaction unit and/or the tail-gas purification unit.

According to an embodiment of present invention, the waste gas of degassing of liquid sulfur can be introduced into the catalytic reaction unit. For example, the waste gas of degassing of liquid sulfur can be introduced into the catalytic reaction unit either at the beginning position or at an intermediate position of the catalytic reaction unit. In the case of the catalytic reaction unit comprising more than one converter, the waste gas of degassing of liquid sulfur can be introduced into the first converter together with the process gas from the thermal reaction unit (i.e. introducing at the beginning position), or the waste gas of degassing of liquid sulfur can be introduced into the next converter together with the product gas from the exact previous converter (i.e. introducing at the intermediate position). The converters and the reactions conducted therein are described in detail hereinbefore.

According to an embodiment of present invention, the waste gas of degassing of liquid sulfur can be introduced into the tail-gas purification unit together with the Claus tail-gas. For example, the waste gas of degassing of liquid sulfur and Claus tail-gas can be introduced together into the hydrogenation reactor of the tail-gas purification unit. For example, the mixed gas of the waste gas of degassing of liquid sulfur and Claus tail-gas can be heated to about 200-about 300° C. and then introduced into the hydrogenation reactor. The hydrogenation reactor and the reactions conducted therein are described in detail hereinbefore.

According to present invention, the direct introduction of the waste-gas of degassing of liquid sulfur into the incinerator and the discharging after burning are avoided and thus sulfur emission is reduced.

According to an embodiment of present invention, in the process of present invention, a portion of the purified tail-gas from the tail-gas purification unit can be used as the stripping gas of the liquid sulfur tank; that is, this portion of the purified tail-gas is used for the degassing of liquid sulfur. The air, steam or nitrogen used as stripping gas thus is omitted. As an example, about 300 to about 1000 $Nm^3/h$ of purified tail-gas is introduced into the liquid sulfur tank as the stripping gas. According to an embodiment, the liquid sulfur is bubbling degassed by the purified tail-gas. Considering the equilibrium between the $H_2S$ contained the purified tail-gas (as stripping gas) and the free $H_2S$ in the liquid sulfur, the $H_2S$ concentration in the purified tail-gas is preferably less than about 50 ppm(v), more preferably less than about 10 ppm(v).

During the degassing, the $H_2S$ in liquid sulfur is stripped out. Preferably, the amount of $H_2S$ dissolved in liquid sulfur is reduced to not more than about 10 ppm (by weight) when degassed. Generally, the waste gas resulting from degassing of liquid sulfur comprises H2S and sulfur vapor.

According to an embodiment of the process of present invention, a portion of the purified tail-gas can be used as the stripping gas of the liquid sulfur, and the waste gas of degassing of liquid sulfur in the liquid sulfur tank can be introduced into the catalytic reaction unit and/or the tail-gas purification unit, preferably the waste gas of degassing of liquid sulfur and the Claus tail-gas are mixed and then introduced into the hydrogenation reactor of the tail-gas purification unit.

According to an embodiment, in the process of present invention, all the purified tail-gas or the residual purified tail-gas is introduced into an incinerator, burned and discharged.

According to a preferred embodiment of the process of present invention, the hydrogenation catalyst in the hydrogenation reactor is a low-temperature oxygen-resistant high-activity hydrogenation catalyst. This catalyst has the following functions simultaneously: deoxygenation, hydrolysis of organo-sulfur compounds, hydrogenation of $SO_2$ and S, and the like, such that sulfur-containing substances other than $H_2S$ can be hydrogenated or hydrolyzed within about 3 seconds into $H_2S$, preventing sulfur penetration. The low-temperature oxygen-resistant high-activity hydrogenation catalyst enables the tail-gas purification unit (i.e. the hydrogenation reactor) to receive such a gas which comprises, by volume, $H_2S$ from about 0.1 to about 5%, $SO_2$ from about 0 to about 1.5%, and organo-sulfur compound(s) from about 0 to about 0.5%, and enables a conversion of at least about 99.9%. As an example, the hydrogenation catalyst comprises, on the basis of the weight of the catalyst, nickel oxide about 0.5~about 3% (active ingredient), cobalt oxide about 1~about 4% (active ingredient), molybdenum oxide or tungsten oxide about 8%~about 20% (active ingredient); about 1~about 5% one or more of ferrous sulfate, ferric nitrate and ferric sulfate (deoxidizer); about 10%~about 40% $TiO_2$, and balance of $\gamma$-$Al_2O_3$. For example, the high-activity hydrogenation catalyst LSH-03 from Shandong Qilu Keli Chemical Institute Co., Ltd can be used.

It is believed that the low-temperature oxygen-resistant high-activity hydrogenation catalyst has excellent organo-sulfur compound hydrolysis activity and $SO_2$ hydrogenation activity at a low temperature and, due to the incorporation of a deoxidizer during the preparation, can remove the oxygen in the sulfur-containing gas so as to prevent the damage of oxygen to the catalyst as well as subsequent units. In contrast, conventional tail-gas hydrogenation catalysts possess no desoxydation function and, if oxygen is contained in the gas to be treated, the active ingredient(s) in the catalyst will be converted from sulfide to oxide, leading to inactivation of catalyst. In the case of introducing waste gas of liquid sulfur degassing into the tail-gas purification unit, this waste gas will inactivate conventional hydrogenation catalysts since the waste gas inherently comprises a certain amount of oxygen.

According to an embodiment of present invention, the desulphurizer used in the absorption column is the high efficiency desulphurizer HS 103 from The Dow Chemical Company (a formulated desulphurizer product). According to an embodiment, in the process of present invention, the purified tail-gas has a $H_2S$ content (by volume) of less than about 50 ppm, preferably less than about 10 ppm, at absorption temperature of about 25-about 42° C., under the conditions of the hydrogenation tail-gas comprising not more than about 5 (v/v) % $H_2S$ and the gas-liquid ratio (v/v) not more than 500.

According to a particularly preferred embodiment, the process according to present invention includes:

combusting acid gas containing about 50-about 100% by volume of $H_2S$ in reaction furnace of a thermal reaction unit at a combusting temperature of about 900-about 1400° C. such that about one third of $H_2S$ is converted into $SO_2$ and conducting Claus reaction between $H_2S$ and $SO_2$, so as to produce element sulfur and a process gas comprising $H_2S$, $SO_2$, COS and $CS_2$; wherein the element sulfur is sent to the liquid sulfur tank, and the process gas comprises, by volume, $H_2S$ about 1-about 8%, $SO_2$ about 0.5-about 4%, organo-sulfur compounds about 0-about 2%;

introducing the process gas into the first converter of a catalytic reaction unit (reaction conditions of temperature about 260-about 350° C. and space velocity about 400-about 1600 $h^{-1}$), and then into the second converter (reaction conditions of temperature about 200-about 260° C. and space velocity about 400-about 1600 $h^{-1}$), wherein Claus catalytic conversion being conducted in the converters so as to provide element sulfur and Claus tail-gas; wherein the element sulfur is sent to the liquid sulfur tank and the Claus tail-gas comprises, by volume, $H_2S$ about 0.1-about 5%, $SO_2$ about 0-about 1.5%, organo-sulfur compounds about 0-about 0.5%;

heating the Claus tail-gas to about 200-about 300° C. and introducing it into hydrogenation reactor of a tail-gas purification unit in which sulfur-containing compounds being converted to $H_2S$ to provide the hydrogenation tail-gas, wherein the high-activity hydrogenation catalyst LSH-03 is packed in the hydrogenation reactor; cooling the hydrogenation tail-gas through a quenching column to about 25-about 42° C. and then introducing it into an amine solution absorption column; wherein high efficiency desulphurizer HS 103 from The Dow Chemical Company is packed in the amine solution absorption column, in which $H_2S$ contained in the hydrogenation tail-gas is absorbed by the amine solution such that the $H_2S$ content in the purified tail-gas is reduced to less than about 10 ppm by volume;

wherein introducing a portion of the purified tail-gas (about 300-about 1000 $Nm^3/h$) into the liquid sulfur tank as stripping gas for degassing of liquid sulfur, mixing the waste gas resulting from degassing of liquid sulfur with the Claus tail-gas and introducing the mixed gas into the hydrogenation reactor to undergo hydrogenation treatment together with the Claus tail-gas; introducing the residue purified tail-gas into an incinerator in which it is burned and then discharged; wherein the $SO_2$ emission of the incinerator is reduced to less than about 100 $mg/m^3$; introducing the $H_2S$-containing amine solution into a regeneration column to regenerate the amine solution and to provide a regenerated acid gas comprising about 20-about 60% v/v $H_2S$, wherein the regenerated acid gas is recycled to the thermal reaction unit for further recovery of element sulfur.

The process according to present invention can reduce the $SO_2$ emission concentration of sulfur recovery plants effectively, and the $H_2S$ in the purified tail-gas even can be eliminated to not more than about 10 ppm(v). The purified tail-gas, when used in the degassing of liquid sulfur, can reduce the $H_2S$ in the liquid sulfur to no more than about 10 ppm (by weight). In present invention, the $SO_2$ emission concentration in the flue gas of sulfur plants can be reduced to not more than about 100 $mg/m^3$. The sulfur plant in the process according to present invention needs a low investment and has a low operation cost. Since an internal gas is used in the degassing of liquid sulfur in the process of present invention, the use of an external gas such as air, nitrogen and steam can be omitted, leading to a reduction of the amount of gas processed and a reduction of the sizes of the pipes and equipments.

Hereinafter, the process according to present invention is described with reference to FIG. 1.

Figure 1:
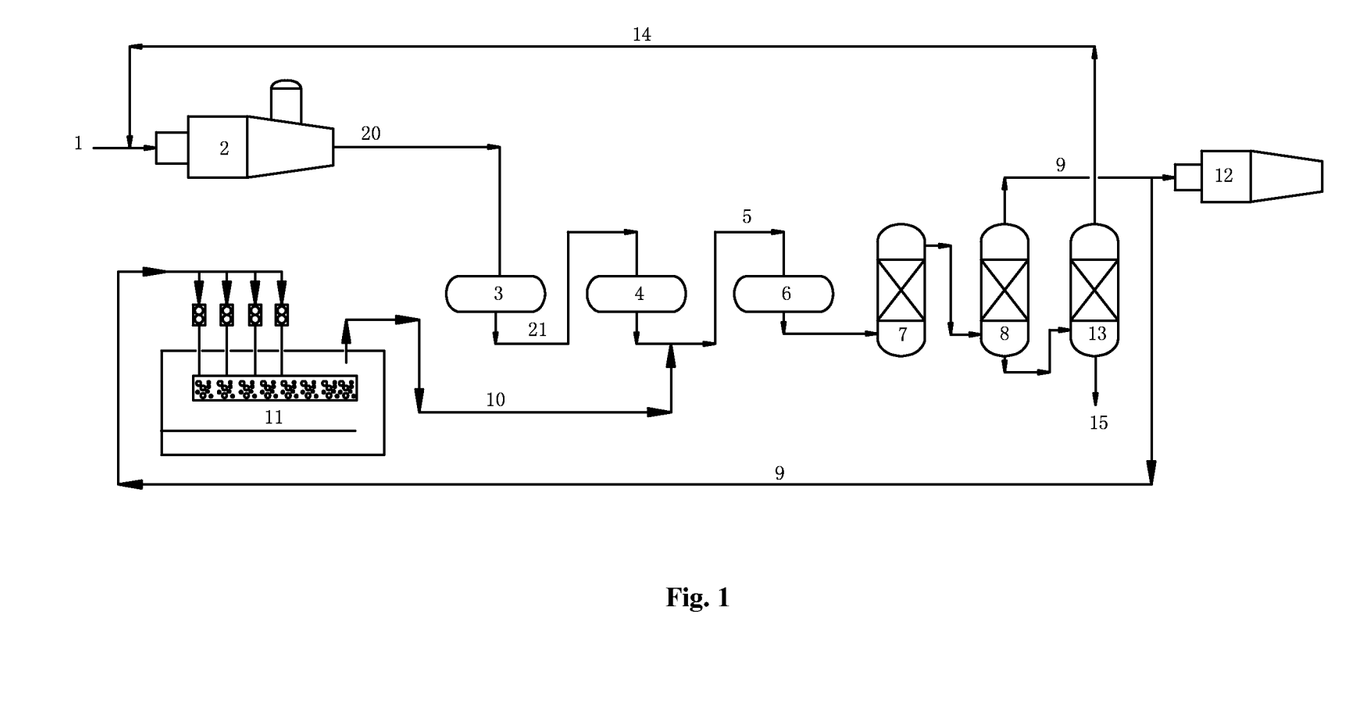
FIG. 1. shows a flow-chart according to an embodiment of process of present invention.

In the process according to FIG. 1 of present invention, acid gas (1) comprising $H_2S$ is sent to the reaction furnace (2) of the thermal reaction unit (corresponding to thermal reaction section). The acid gas (1) is partially combusted in the reaction furnace (2) to provide $SO_2$ and Claus reaction is conducted between $H_2S$ and $SO_2$, resulting in element sulfur and a process gas (20). The element sulfur is sent to the liquid sulfur tank (11) to provide liquid sulfur. The process gas (20) is sent to the first converter (3) and then to the second converter (4) of the catalytic reaction unit (corresponding to catalytic reaction section), wherein element sulfur and Claus tail-gas (5) are obtained after Claus catalytic conversion. The element sulfur is sent to the liquid sulfur tank (11). The Claus tail-gas (5) is introduced into the tail-gas purification unit (corresponding to tail-gas purification section).

The Claus tail-gas (5) is firstly hydrogenated in the hydrogenation reactor (6) of the tail-gas purification unit to provide the hydrogenation tail-gas. The hydrogenation tail-gas then is cooled down in the quenching column (7), and finally introduced into the absorption column (8). In the absorption column (8), the $H_2S$ in the hydrogenation tail-gas is absorbed so as to provide the purified tail-gas (9). A portion of the purified tail-gas (9) is introduced into the liquid sulfur tank (11) as the stripping gas of degassing of liquid sulfur. The waste gas (10) resulting from the degassing of liquid sulfur is mixed with the Claus tail-gas (5) and introduced into the hydrogenation reactor (6). The residual purified tail-gas is introduced into incinerator (12), burned and discharged. The amine solution with absorbed $H_2S$ (rich amine solution) is introduced into regeneration column (13) for regeneration and the resulting $H_2S$-containing regenerated acid gas (14) is mixed acid gas (1) and introduced into reaction furnace (2).

Figure 2:
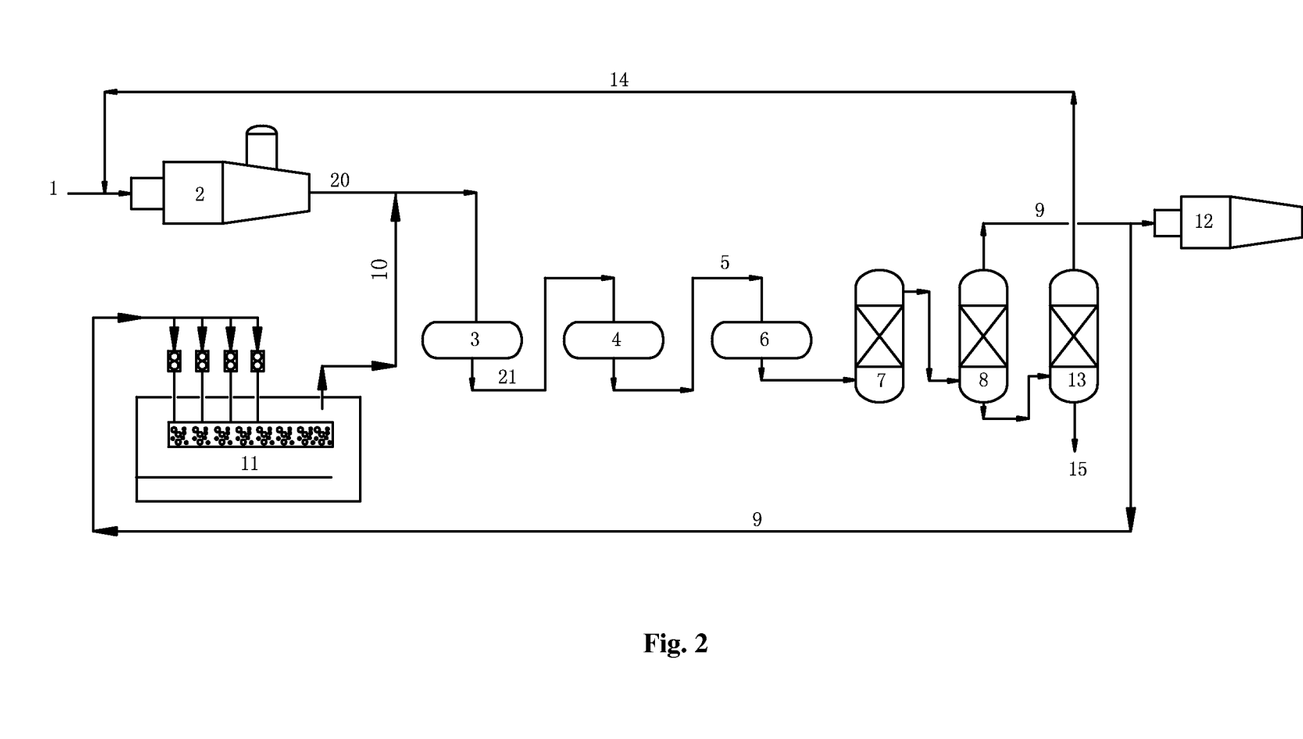
FIG. 2. shows a flow-chart according to another embodiment of process of present invention.

In the process illustrated in FIG. 2, the waste gas (10) of degassing of liquid sulfur is mixed with the process gas (20) and introduced into the first converter (3). In the process illustrated in FIG. 3, the waste gas (10) of degassing of liquid sulfur is mixed with the tail-gas (21) of the first converter (3) and introduced into the second converter (4).

Figure 4:
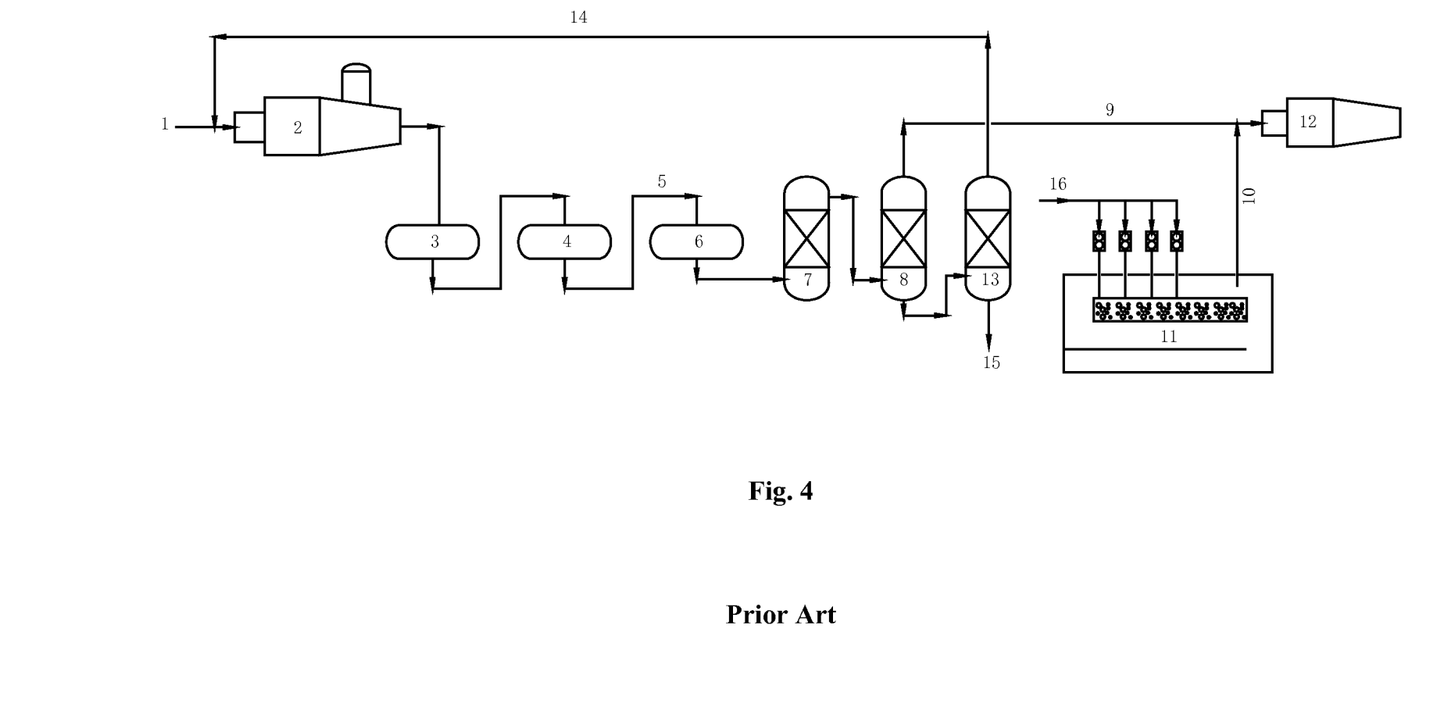

In the process illustrated in FIG. 4, the waste gas (10) of degassing of liquid sulfur is introduced into the incinerator (12).

Figure 5:
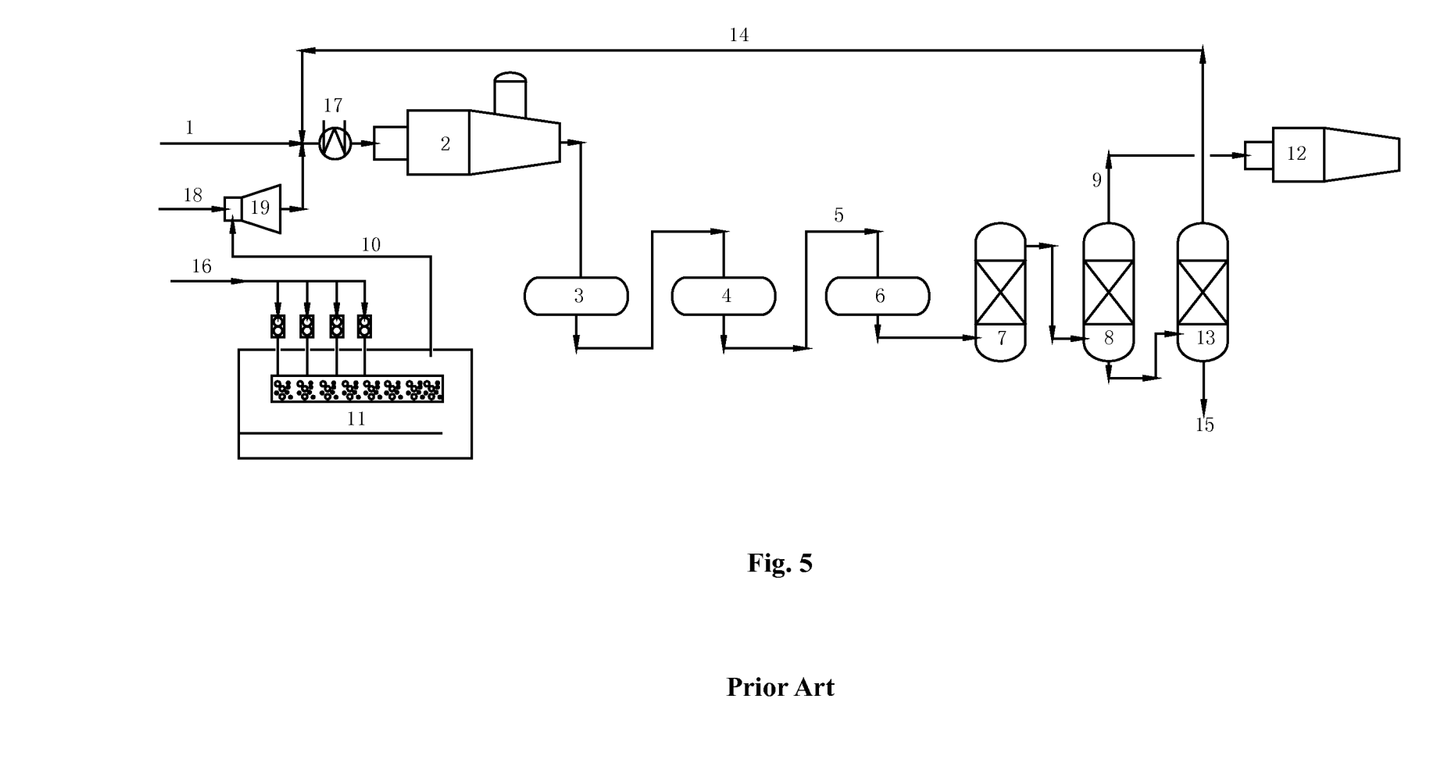
FIG. 5. show flow-charts according to two processes in prior art.

In the process illustrated in FIG. 5, the waste gas (10) of degassing of liquid sulfur is firstly introduced into steam ejector (19) for pressurization, then mixed with the acid gas (1), preheated and introduced into the reaction furnace (2).

Hereinafter, the present invention is illustrated by way of an Example.

EXAMPLE 1

The procedure of this example was as illustrated FIG. 1. This procedure included thermal reaction section, catalytic reaction section and tail-gas purification section.

In the thermal reaction section, acid gas (1) comprising 90 (v/v) % of H2S was partially combusted in the reaction furnace (2), wherein about one third of $H_2S$ was converted into $SO_2$. At 1250° C., $H_2S$ reacted with $SO_2$ according to Claus reaction so as to produce element sulfur and a process gas (20), wherein the element sulfur was sent to liquid sulfur tank (11) to obtain liquid sulfur. This process gas (20) comprised, by volume, $H_2S$ 6%, $SO_2$ 2.5%, organo-sulfur compounds 0.5%.

The process gas (20) was introduced into the first converter (3) (operation conditions: 300° C., space velocity 800 $h^{-1}$) and then the second converter (4) (operation conditions: 250° C., space velocity 800 $h^{-1}$) of the catalytic reaction section. After the Claus catalytic conversion (in the presence of alumina-based Claus catalyst—LS-300 from Shandong Qilu Keli Chemical Institute Co., Ltd), element sulfur and Claus tail-gas (5) were obtained. The element sulfur was sent to the liquid sulfur tank (11) and the Claus tail-gas (5) was introduced into the hydrogenation reactor (6) (inlet temperature 220° C.) of the tail-gas purification section. This Claus tail-gas comprised, by volume, $H_2S$ 3%, $SO_2$ 1.5%, organo-sulfur compounds 0.1%.

In the hydrogenation reactor (6), in the presence of hydrogenation catalyst LSH-03, the sulfur-containing compounds in the Claus tail-gas were hydrogenated into H2S (reaction conditions: 240° C., space velocity 1000 $h^{-1}$) so as to provide a hydrogenation tail-gas. The hydrogenation tail-gas was cooled to 40° C. through quenching column (7) and introduced into the amine solution absorption column (8). H2S contained in the hydrogenation tail-gas was absorbed by the amine solution (temperature of column top: 38° C., gas-liquid ratio (v/v) 120:1) and the $H_2S$ content in the purified tail-gas (9) was reduced to 9 ppm(v). 500 $Nm^3/h$ of the purified tail-gas (9) was introduced into the liquid sulfur tank (11) as stripping gas for bubbling degassing of liquid sulfur. The waste-gas (10) of degassing of the liquid sulfur was ejected out through an ejector, mixed with the Claus tail-gas (5) and introduced into the hydrogenation reactor (6), in which it was hydrogenated together with the Claus tail-gas (reaction conditions were described above). The rest of purified tail-gas was introduced into the incinerator (12), burned and released. The $H_2S$-containing amine solution (rich amine solution) was sent to regeneration column (13) to regenerate the amine solution and to provide a regenerated acid gas (14) comprising 50 v/v % $H_2S$, wherein the regenerated acid gas (14) was recycled to the thermal reaction section and mixed with acid gas (1) for further recovery of element sulfur.

In this example, external gas was not required in the degassing of liquid sulfur, and the sulfur and sulfur-containing compounds in the waste-gas of liquid sulfur degassing were recovered. The $SO_2$ emission concentration was 78 mg/m³ in the final flue gas of sulfur plant.

The desulphurizer used in the amine solution absorption column (8) was the high efficiency desulphurizer HS 103 from The Dow Chemical Company.

EXAMPLE 2

The procedure of this example was as illustrated FIG. 1. This procedure included thermal reaction section, catalytic reaction section and tail-gas purification section.

In the thermal reaction section, acid gas (1) comprising 75 (v/v) % of $H_2S$ was partially combusted in the reaction furnace (2), wherein about one third of $H_2S$ was converted into $SO_2$. At 1250° C., $H_2S$ reacted with $SO_2$ according to Claus reaction so as to produce element sulfur and a process gas (20), wherein the element sulfur was sent to liquid sulfur tank (11) to obtain liquid sulfur. This process gas (20) comprised, by volume, $H_2S$ 8%, $SO_2$ 3%, organo-sulfur compounds 1%.

The process gas (20) was introduced into the first converter (3) (operation conditions: 320° C., space velocity 800 $h^{-1}$) and then the second converter (4) (operation conditions: space velocity 250° C., 800 $h^{-1}$) of the catalytic reaction section. After the Claus catalytic conversion (in the presence of alumina-based Claus catalyst—LS-300 from Shandong Qilu Keli Chemical Institute Co., Ltd and titania-based Claus catalyst—LS-901 from Shandong Qilu Keli Chemical Institute Co., Ltd), element sulfur and Claus tail-gas (5) were obtained. The element sulfur was sent to the liquid sulfur tank (11) and the Claus tail-gas (5) was introduced into the hydrogenation reactor (6) (inlet temperature 220° C.) of the tail-gas purification section. This Claus tail-gas comprised, by volume, $H_2S$ 3%, $SO_2$ 1.5%, organo-sulfur compounds 0.08%.

In the hydrogenation reactor (6), in the presence of hydrogenation catalyst LSH-03, the sulfur-containing compounds in the Claus tail-gas were hydrogenated into H2S (reaction conditions: 240° C., space velocity 1000 $h^{-1}$) so as to provide a hydrogenation tail-gas. The hydrogenation tail-gas was cooled to 40° C. through quenching column (7) and introduced into the amine solution absorption column (8). $H_2S$ contained in the hydrogenation tail-gas was absorbed by the amine solution (temperature of column top: 38° C., gas-liquid ratio (v/v) 120:1) and the H2S content in the purified tail-gas (9) was reduced to 10 ppm(v). 500 Nm³/h of the purified tail-gas (9) was introduced into the liquid sulfur tank (11) as stripping gas for bubbling degassing of liquid sulfur. The waste-gas (10) of degassing of the liquid sulfur was ejected out through an ejector, mixed with the Claus tail-gas (5) and introduced into the hydrogenation reactor (6), in which it was hydrogenated together with the Claus tail-gas (reaction conditions were described above). The rest of purified tail-gas was introduced into the incinerator (12), burned and released.

The H2S-containing amine solution (rich amine solution) was sent to regeneration column (13) to regenerate the amine solution and to provide a regenerated acid gas (14) comprising 40 v/v % H2S, wherein the regenerated acid gas (14) was recycled to the thermal reaction section and mixed with acid gas (1) for further recovery of element sulfur.

In this example, external gas was not required in the degassing of liquid sulfur, and the sulfur and sulfur-containing compounds in the waste-gas of liquid sulfur degassing were recovered. The $SO_2$ emission concentration was reduced to 89 mg/m³ in the final flue gas of sulfur plant.

The desulphurizer used in the amine solution absorption column (8) was the high efficiency desulphurizer HS 103 from The Dow Chemical Company.

EXAMPLE 3

The procedure of this example was as illustrated FIG. 1. This procedure included thermal reaction section, catalytic reaction section and tail-gas purification section.

In the thermal reaction section, acid gas (1) comprising 55 (v/v) % of $H_2S$ was partially combusted in the reaction furnace (2), wherein about one third of $H_2S$ was converted into $SO_2$. At 1250° C., $H_2S$ reacted with $SO_2$ according to Claus reaction so as to produce element sulfur and a process gas (20), wherein the element sulfur was sent to liquid sulfur tank (11) to obtain liquid sulfur. This process gas (20) comprised, by volume, $H_2S$ 4%, $SO_2$ 2%, organo-sulfur compounds 0.3%.

The process gas (20) was introduced into the first converter (3) (operation conditions: 320° C., space velocity 800 $h^{-1}$) and then the second converter (4) (operation conditions: 250° C., space velocity 800 $h^{-1}$) of the catalytic reaction section. After the Claus catalytic conversion (in the presence of alumina-based Claus catalyst—LS-300 from Shandong Qilu Keli Chemical Institute Co., Ltd and titania-based Claus catalyst—LS-901 from Shandong Qilu Keli Chemical Institute Co., Ltd), element sulfur and Claus tail-gas (5) were obtained. The element sulfur was sent to the liquid sulfur tank (11) and the Claus tail-gas (5) was introduced into the hydrogenation reactor (6) (inlet temperature 220° C.) of the tail-gas purification section. This Claus tail-gas comprised, by volume, $H_2S$ 1.5%, $SO_2$ 0.6%, organo-sulfur compounds 0.05%.

In the hydrogenation reactor (6), in the presence of hydrogenation catalyst LSH-03, the sulfur-containing compounds in the Claus tail-gas were hydrogenated into $H_2S$ (reaction conditions: 240° C., 1000 $h^{-1}$) so as to provide a hydrogenation tail-gas. The hydrogenation tail-gas was cooled to 40° C. through quenching column (7) and introduced into the amine solution absorption column (8). H2S contained in the hydrogenation tail-gas was absorbed by the amine solution (temperature of column top: 38° C., gas-liquid ratio (v/v) 120:1) and the $H_2S$ content in the purified tail-gas (9) was reduced to 5 ppm(v). 800 Nm³/h of the purified tail-gas (9) was introduced into the liquid sulfur tank (11) as stripping gas for bubbling degassing of liquid sulfur. The waste-gas (10) of degassing of the liquid sulfur was ejected out through an ejector, mixed with the Claus tail-gas (5) and introduced into the hydrogenation reactor (6), in which it was hydrogenated together with the Claus tail-gas (reaction conditions were described above). The rest of purified tail-gas was introduced into the incinerator (12), burned and released. The $H_2S$-containing amine solution (rich amine solution) was sent to regeneration column (13) to regenerate the amine solution and to provide a regenerated acid gas (14) comprising 30 v/v % $H_2S$, wherein the regenerated acid gas (14) was recycled to the thermal reaction section and mixed with acid gas (1) for further recovery of element sulfur.

In this example, external gas was not required in the degassing of liquid sulfur, and the sulfur and sulfur-containing compounds in the waste-gas of liquid sulfur degassing were recovered. The $SO_2$ emission concentration was reduced to 100 mg/m$^3$ in the final flue gas of sulfur plant.

The desulphurizer used in the amine solution absorption column (8) was the high efficiency desulphurizer HS 103 from The Dow Chemical Company.

EXAMPLE 4

The procedure of this example was as illustrated FIG. 2. This procedure included thermal reaction section, catalytic reaction section and tail-gas purification section.

In the thermal reaction section, acid gas (1) comprising 75 (v/v) % of $H_2S$ was partially combusted in the reaction furnace (2), wherein about one third of $H_2S$ was converted into $SO_2$. At 1250° C., H2S reacted with $SO_2$ according to Claus reaction so as to produce element sulfur and a process gas (20), wherein the element sulfur was sent to liquid sulfur tank (11) to obtain liquid sulfur. This process gas (20) comprised, by volume, $H_2S$ 8%, $SO_2$ 3%, organo-sulfur compounds 1%.

The process gas (20) was introduced into the first converter (3) (operation conditions: 320° C., space velocity 800 h$^{-1}$) and then the second converter (4) (operation conditions: 250° C., space velocity 800 h$^{-1}$) of the catalytic reaction section. After the Claus catalytic conversion (in the presence of alumina-based Claus catalyst—LS-300 from Shandong Qilu Keli Chemical Institute Co., Ltd and titania-based Claus catalyst—LS-901 from Shandong Qilu Keli Chemical Institute Co., Ltd), element sulfur and Claus tail-gas (5) were obtained. The element sulfur was sent to the liquid sulfur tank (11) and the Claus tail-gas (5) was introduced into the hydrogenation reactor (6) (inlet temperature 220° C.) of the tail-gas purification section. This Claus tail-gas comprised, by volume, $H_2S$ 3%, $SO_2$ 1.5%, organo-sulfur compounds 0.08%.

In the hydrogenation reactor (6), in the presence of hydrogenation catalyst LSH-03, the sulfur-containing compounds in the Claus tail-gas were hydrogenated into $H_2S$ (reaction conditions: 240° C., 1000 h$^{-1}$) so as to provide a hydrogenation tail-gas. The hydrogenation tail-gas was cooled to 40° C. through quenching column (7) and introduced into the amine solution absorption column (8). $H_2S$ contained in the hydrogenation tail-gas was absorbed by the amine solution (temperature of column top: 38° C., gas-liquid ratio (v/v) 120:1) and the H2S content in the purified tail-gas (9) was reduced to 10 ppm(v). 500 Nm$^3$/h of the purified tail-gas (9) was introduced into the liquid sulfur tank (11) as stripping gas for bubbling degassing of liquid sulfur. The waste-gas (10) of degassing of the liquid sulfur was ejected out through an ejector, mixed with the process gas (20) and introduced into the first converter (3) for Claus catalytic conversion. The rest of purified tail-gas was introduced into the incinerator (12), burned and released. The H2S-containing amine solution (rich amine solution) was sent to regeneration column (13) to regenerate the amine solution and to provide a regenerated acid gas (14) comprising 40 v/v % $H_2S$, wherein the regenerated acid gas (14) was recycled to the thermal reaction section and mixed with acid gas (1) for further recovery of element sulfur.

In this example, external gas was not required in the degassing of liquid sulfur, and the sulfur and sulfur-containing compounds in the waste-gas of liquid sulfur degassing were recovered. The $SO_2$ emission concentration was reduced to 96 mg/m$^3$ in the final flue gas of sulfur plant.

The desulphurizer used in the amine solution absorption column (8) was the high efficiency desulphurizer HS 103 from The Dow Chemical Company.

EXAMPLE 5

Figure 3:
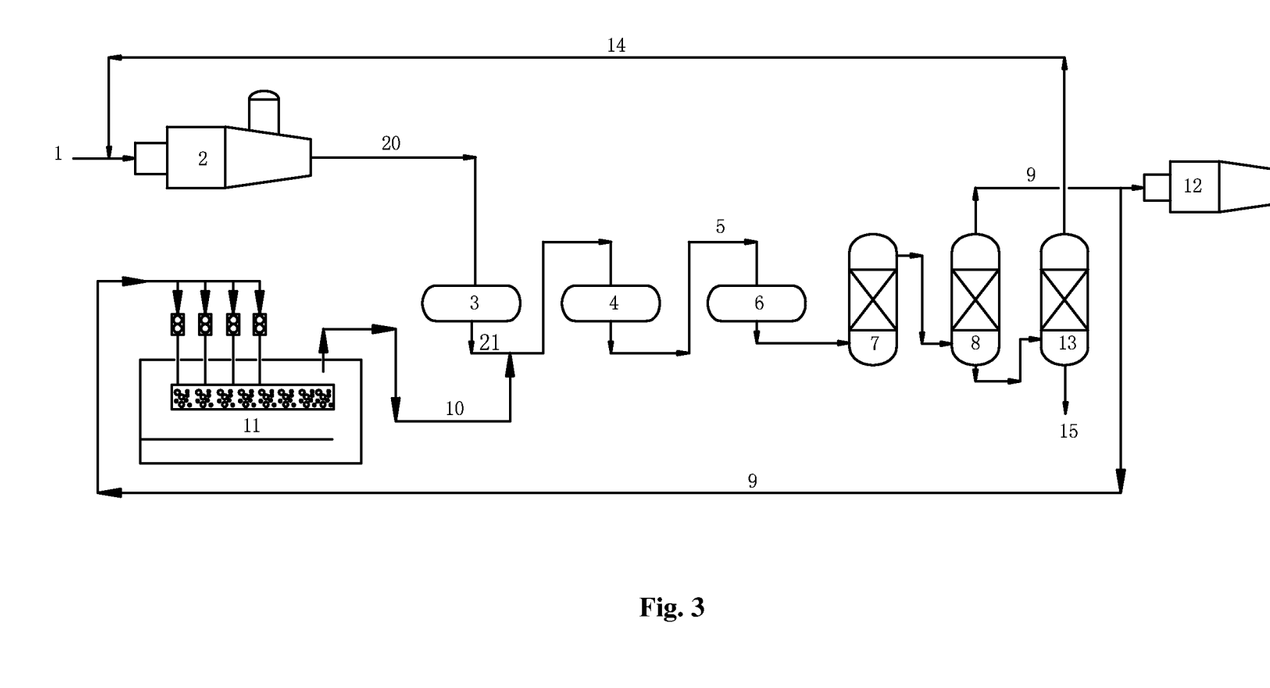
FIG. 3. shows a flow-chart according to yet another embodiment of process of present invention.

The procedure of this example was as illustrated FIG. 3. This procedure included thermal reaction section, catalytic reaction section and tail-gas purification section.

In the thermal reaction section, acid gas (1) comprising 75 (v/v) % of $H_2S$ was partially combusted in the reaction furnace (2), wherein about one third of $H_2S$ was converted into $SO_2$. At 1250° C., $H_2S$ reacted with $SO_2$ according to Claus reaction so as to produce element sulfur and a process gas (20), wherein the element sulfur was sent to liquid sulfur tank (11) to obtain liquid sulfur. This process gas (20) comprised, by volume, $H_2S$ 8%, $SO_2$ 3%, organo-sulfur compounds 1%.

The process gas (20) was introduced into the first converter (3) (operation conditions: 320° C., space velocity 800 h$^{-1}$) and then the second converter (4) (operation conditions: 250° C., space velocity 800 h$^{-1}$) of the catalytic reaction section. After the Claus catalytic conversion (in the presence of alumina-based Claus catalyst—LS-300 from Shandong Qilu Keli Chemical Institute Co., Ltd and titania-based Claus catalyst—LS-901 from Shandong Qilu Keli Chemical Institute Co., Ltd), element sulfur and Claus tail-gas (5) were obtained. The element sulfur was sent to the liquid sulfur tank (11) and the Claus tail-gas (5) was introduced into the hydrogenation reactor (6) (inlet temperature 220° C.) of the tail-gas purification section. This Claus tail-gas comprised, by volume, $H_2S$ 3%, $SO_2$ 1.5%, organo-sulfur compounds 0.08%.

In the hydrogenation reactor (6), in the presence of hydrogenation catalyst LSH-03, the sulfur-containing compounds in the Claus tail-gas were hydrogenated into $H_2S$ (reaction conditions: 240° C., space velocity 1000 h$^{-1}$) so as to provide a hydrogenation tail-gas. The hydrogenation tail-gas was cooled to 40° C. through quenching column (7) and introduced into the amine solution absorption column (8). $H_2S$ contained in the hydrogenation tail-gas was absorbed by the amine solution (temperature of column top: 38° C., gas-liquid ratio (v/v) 120:1) and the $H_2S$ content in the purified tail-gas (9) was reduced to 10 ppm(v). 500 Nm$^3$/h of the purified tail-gas (9) was introduced into the liquid sulfur tank (11) as stripping gas for bubbling degassing of liquid sulfur. The waste-gas (10) of degassing of the liquid sulfur was ejected out through an ejector, mixed with the tail-gas (21) of the first converter (3) and introduced into the second converter (4) for Claus catalytic conversion. The rest of purified tail-gas was introduced into the incinerator (12), burned and released. The $H_2S$-containing amine solution (rich amine solution) was sent to regeneration column (13) to regenerate the amine solution and to provide a regenerated acid gas (14) comprising 40 v/v % $H_2S$, wherein the regenerated acid gas (14) was recycled to the thermal reaction section and mixed with acid gas (1) for further recovery of element sulfur.

In this example, external gas was not required in the degassing of liquid sulfur, and the sulfur and sulfur-containing compounds in the waste-gas of liquid sulfur degassing were recovered. The $SO_2$ emission concentration was reduced to 99 mg/m$^3$ in the final flue gas of sulfur plant.

The desulphurizer used in the amine solution absorption column (8) was the high efficiency desulphurizer HS 103 from The Dow Chemical Company.

EXAMPLE 6

Hydrogenation tail-gas, comprising 4 (v/v) %, 3 (v/v) %, 2 (v/v) % and 1 (v/v) % $H_2S$ respectively, was treated with high efficiency desulphurizer HS 103 from The Dow Chemical Company, under the conditions of absorption temperature 38° C. and a gas-liquid ratio (v/v) 300:1. The $H_2S$ content of the resulting purified tail-gas was summarized in table 1.

COMPARATIVE EXAMPLE 7

Example 6 was repeated except that a conventional desulphurizer MDEA was used. The $H_2S$ content of resulting purified tail-gas was summarized in table 1.

TABLE 1

| $H_2S$ content of purified tail-gas | | | | |
|---|---|---|---|---|
| $H_2S$, (v/v) %, in hydrogenation tail-gas | 4 | 3 | 2 | 1 |
| $H_2S$, ppm(v), in purified tail-gas, desulphurizer HS103 | 11 | 9 | 8 | 6 |
| $H_2S$, ppm(v), in purified tail-gas, conventional desulphurizer MDEA | 480 | 398 | 305 | 190 |

It is clear from table 1 that the desulphurizer HS103 is superior to the conventional desulphurizer MDEA regarding the purification of $H_2S$. The $SO_2$ emission concentration can be reduced remarkably by the desulphurizer HS103 and the reduction is 300-800 $mg/m^3$.

COMPARATIVE EXAMPLE 8

Example 1 was repeated except that external nitrogen (16) was used as the stripping gas for the degassing of liquid sulfur and the waste gas (10) from degassing was mixed with all the purified tail-gas (9) and introduced into the incinerator (12). The complete procedure was illustrated in FIG. 4. In this comparative example, H2S contained in the hydrogenation tail-gas was 3(v/v) %. The $SO_2$ emission concentration of the sulfur plant was summarized in table 2.

COMPARATIVE EXAMPLE 9

Example 1 was repeated except that external nitrogen (16) was used as the stripping gas for the degassing of liquid sulfur and the waste gas (10) from degassing was pressurized by steam ejector (19) and then mixed with the acid gas (1), preheated and introduced into the reaction furnace (2). The complete procedure was illustrated in FIG. 5. In this comparative example, $H_2S$ contained in the hydrogenation tail-gas was 3 (v/v) %. The $SO_2$ emission concentration of the sulfur plant was summarized in table 2.

TABLE 2

| $SO_2$ emission concentration in flue gas of sulfur plant | | | |
|---|---|---|---|
| | Example 1 (present invention) | Comparative example 8 | Comparative example 9 |
| $SO_2$ emission concentration, $mg/m^3$ | 78 | 762 | 189 |

It is clear for table 2 that the treatment mode of the waste-gas of liquid sulfur degassing has a great influence to $SO_2$ emission concentration. In comparative example 8, the waste-gas of liquid sulfur degassing is introduced directly into the incinerator, burned and discharged, leading to a great increase of $SO_2$ emission. In comparative example 9, $SO_2$ emission concentration is reduced since the waste gas from liquid sulfur degassing was pressurized by steam ejector and introduced into the reaction furnace. However, the procedure of comparative example 9 has the defects of: (1) the incorporation of steam will decrease the hearth temperature of the reaction furnace and the acid gas should be preheated to maintain the reaction temperature in the furnace not lower than 1150° C.; and (2) steam is required and the amount of gas to be treated accordingly will increase, leading to increased sizes of pipes and equipments and increased investment and energy consumption.

EXAMPLE 10

Example 1 was repeated except that different inlet temperatures were adopted for the hydrogenation reactor, wherein the $H_2S$ content of the purified tail-gas was 9 ppm(v). The inlet temperatures and the results were summarized in table 3.

COMPARATIVE EXAMPLE 11

Example 1 was repeated except that Claus tail-gas hydrogenation catalyst LS-951 from Institute of Qilu Branch, SINOPEC was used in the hydrogenation reactor and different inlet temperatures were adopted for the hydrogenation reactor. If required, the waste-gas of liquid sulfur degassing was heated to the desirable temperature by a heater. The inlet temperatures and the results were summarized in table 3.

TABLE 3

| results for different hydrogenation catalysts | | | |
|---|---|---|---|
| inlet temperature of hydrogenation reactor, ° C. | | Example 10 (present invention) | Comparative example 11 |
| 220 | Hydrogenation conversion, % | 100 | 70 |
| | Hydrolysis conversion, % | 100 | 51 |
| | performance | well running | sulfur deposited in quenching column |
| 240 | Hydrogenation conversion, % | 100 | 95 |
| | Hydrolysis conversion, % | 100 | 80 |
| | performance | well running | sulfur deposited in quenching column |
| 260 | Hydrogenation conversion, % | 100 | 100 |
| | Hydrolysis conversion, % | 100 | 95 |
| | performance | well running | sulfur deposited in quenching column |
| 280 | Hydrogenation conversion, % | 100 | 100 |
| | Hydrolysis conversion, % | 100 | 100 |
| | performance | well running | well running |

It is clear from the results of table 3 that, in example 10 (in which hydrogenation catalyst LSH-03 is used), the inlet temperature of hydrogenation reactor can be reduced to 220° C. and the sulfur plant operates well. The waste gas of liquid sulfur degassing can be mixed directly, without heating, with the Claus tail-gas. When the conventional Claus tail-gas hydrogenation catalyst LS-951 is used, a gas heater is needed to heat the waste gas of liquid sulfur degassing to about 280° C. such that the hydrogenation conversion and hydrolysis conversion can reach 100%. When the temperature is lower than 260° C., the hydrogenation conversion and hydrolysis conversion can not meet the operating requirements and the deposition of sulfur in the quenching column is observed frequently, revealing sulfur penetration due to incomplete hydrogenation of the sulfur vapor carried in the waste gas of liquid sulfur degassing.

The invention claimed is:

1. A process for reducing sulfur emission of a sulfur plant, comprising:
   introducing a $H_2S$-containing acid gas into a thermal reaction unit, combusting the $H_2S$-containing acid gas to produce SO2, and conducting Claus reaction between $H_2S$ and $SO_2$ to produce a first elemental sulfur stream and a process gas, wherein the first elemental sulfur stream is introduced into a liquid sulfur tank;
   introducing the process gas into a catalytic reaction unit to carry out Claus catalytic conversion to obtain a second elemental sulfur stream and a Claus tail gas, wherein the second elemental sulfur stream is introduced into the liquid sulfur tank; and
   introducing the Claus tail gas into a tail gas purification unit, wherein the Claus tail gas firstly undergoes hydrogenation to produce a hydrogenation tail gas comprising $H_2S$, and introducing the hydrogenation tail gas into an absorption column, wherein $H_2S$ is absorbed in the absorption column to provide a purified tail gas;
   introducing a portion of the purified tail gas into the liquid sulfur tank as a stripping gas for degassing the liquid sulfur, wherein the purified tail gas is converted to a waste gas; and
   introducing the waste gas into the catalytic reaction unit, the tail gas purification unit, or a combination thereof.

2. The process according to claim 1, wherein the waste gas is introduced into the tail gas purification unit together with the Claus tail gas.

3. The process according to claim 1, wherein an amount of the purified tail gas introduced into the liquid sulfur tank is from about 300 to about 1000 $Nm^3/h$.

4. The process according to claim 1, wherein a content of $H_2S$ in the purified tail gas is less than about 50 ppm by volume.

5. The process according to claim 4, wherein the content of $H_2S$ in the purified tail gas is less than about 10 ppm by volume.

6. The process according to claim 1, wherein an amine solution is employed in the absorption column to absorb $H_2S$ from the Claus tail gas and the amine solution is converted to a $H_2S$-rich amine solution.

7. The process according to claim 6, wherein the purified tail gas is less than about 50 ppm by volume at an absorption temperature of from about 25 to about 42° C.

8. The process according to claim 1, wherein the hydrogenation in the tail gas purification unit is conducted in the presence of an oxygen-resistant hydrogenation catalyst.

9. The process according to claim 8, wherein the Claus tail gas entering the tail gas purification unit comprises, by volume, $H_2S$ from about 0.1 to about 5%, $SO_2$ from about 0 to about 1.5%, and organo-sulfur compound(s) from about 0 to about 0.5%.

10. The process of claim 9, wherein a total conversion of $H_2S$, $SO_2$, and the organo-sulfur compound(s) is at least about 99.9%.

11. The process according to claim 1, further comprising:
   regenerating the $H_2S$-rich amine solution in a regeneration column to obtained a regenerated acid gas; and
   introducing the regenerated acid gas into the thermal reaction unit.

12. A method of using a purified tail gas from a sulfur plant, comprising:
   treating a Claus tail gas in a tail gas purification unit to obtain a purified tail gas; and
   introducing a portion of the purified tail gas into a liquid sulfur as a stripping gas for degassing the liquid sulfur.

13. The method of claim 12, wherein the tail gas purification unit employs an amine solution to absorb $H_2S$ from the Claus tail gas.

14. The method of claim 13, wherein the purified tail gas comprises less than about 50 ppm $H_2S$ by volume.

* * * * *